United States Patent
Chen

(10) Patent No.: US 10,917,719 B1
(45) Date of Patent: Feb. 9, 2021

(54) METHOD AND DEVICE FOR POSITIONING SOUND SOURCE BY USING FISHEYE LENS

(71) Applicant: Lijun Chen, Shanghai (CN)

(72) Inventor: Lijun Chen, Shanghai (CN)

(73) Assignee: Lijun Chen, Shanghai (CN)

( * ) Notice: Subject to any disclaimer, the term of this patent is extended or adjusted under 35 U.S.C. 154(b) by 0 days.

(21) Appl. No.: 16/688,877

(22) Filed: Nov. 19, 2019

(51) Int. Cl.
  *H04R 3/00* (2006.01)
  *H04R 1/40* (2006.01)
  *H04N 5/232* (2006.01)

(52) U.S. Cl.
  CPC ......... *H04R 3/005* (2013.01); *H04N 5/23238* (2013.01); *H04R 1/406* (2013.01)

(58) Field of Classification Search
  CPC ..... H04R 3/005; H04R 1/406; H04N 5/23238
  See application file for complete search history.

(56) References Cited

U.S. PATENT DOCUMENTS

| | | | | |
|---|---|---|---|---|
| 2003/0160862 | A1* | 8/2003 | Charlier | H04N 5/2627 348/14.08 |
| 2015/0281832 | A1* | 10/2015 | Kishimoto | H04R 1/406 381/92 |
| 2020/0103939 | A1* | 4/2020 | Hsu | H04R 1/406 |

* cited by examiner

*Primary Examiner* — Andrew L Sniezek
(74) *Attorney, Agent, or Firm* — CBM Patent Consulting, LLC

(57) ABSTRACT

A method and device for positioning a sound source by using a fisheye lens. The method is used for positioning a sound source for an incident straight line or an incidence angle of a sound wave in conjunction with a fisheye lens. The method and device for positioning the sound source by using the fisheye lens as provided by the present invention have the following advantages, that include, but are not limited to the followings: the method and device for positioning the sound source by using the fisheye lens as provided by the present invention make use of the characteristics of the fisheye lens to realize angular positioning instead of positional positioning.

11 Claims, 4 Drawing Sheets

Step a. calculating an incident angle of a sound

Step b. positioning a sound source according to the incident angle of the sound wave in connection with a fisheye lens

```
Step a. calculating an incident angle of
a sound
```

↓

```
Step b. positioning a sound source according to the incident
angle of the sound wave in connection with a fisheye lens
```

METHOD AND DEVICE FOR POSITIONING SOUND SOURCE BY USING FISHEYE LENS

This application claims priority to Chinese Patent Application Ser. No. CN2019107897913 filed 26 Aug. 2019.

TECHNICAL FIELD

The present invention relates to the technical field of sound source positioning, in particular to a method and device for positioning a sound source by using a fisheye lens.

BACKGROUND

At present, a traditional acoustic camera is positioned by a binaural microphone. A beamforming method is adopted to position a sound source, but is accompanied with certain limitations. A sound source at an extreme position of a microphone array, such as at the rightmost or leftmost end, or even at the topmost and bottommost of the array, or beyond this range will produce ghosts (the position of a real sound source is completely inconsistent with the position of a sound source obtained by taking a picture). Therefore, the traditional acoustic camera has a narrow shooting range and cannot cover a large angle.

SUMMARY

An objective of the present invention is to solve the defects of the prior art, and to provide a method and device for positioning a sound source by using a fisheye lens, which are novel and effective and contribute to positioning a sound source conveniently by the fisheye lens.

To fulfill said objective, a method of positioning a sound source by using a fisheye lens is designed. The method is used for positioning a sound source by means of an incident straight line or an incident angle of acoustic waves in conjunction with a fisheye lens.

The present invention adopts the following preferred technical solutions.

The method comprises the following steps: a. establishing a corresponding relationship of an incident angle of a sound wave, a distance between the sound source and the fisheye lens and a sound source distance difference, to be specific: providing a fisheye lens and at least two microphones, the two microphones forming a set of microphones, and two microphones included in any two sets of microphones being not identical; calculating a sound source distance difference of each set of microphones corresponding to the incident angles of different sound waves and the distance between the sound source and the fisheye lens, the sound source distance difference referring to an absolute value of a difference of the distances between the sound source and each microphone in each set of microphones; and b. positioning the sound source according to the corresponding relationship, and performing imaging display by using the fisheye lens, to be specific: obtaining the incident angle of the sound wave and the distance between the sound source and the fisheye lens, that correspond to the sound source distance difference of the microphone sets, through the measured sound source distance difference of the microphone sets, and displaying a position where the sound source is positioned in a display device of the fisheye lens.

The method specifically comprises: providing at least three microphones, thereby obtaining an incident straight line of at least one sound wave or at least two sound wave incident surfaces which are not parallel, but coincident.

According to the method, every two microphones form a set of microphones, and the two microphones included in any two sets of microphones are not identical; the sound source distance difference of at least two sets of microphones is calculated; the sound wave incident surface of the sound wave relative to the microphone sets is calculated according to the sound source distance difference of any set of microphones, and an intersection of the sound wave incident surfaces of any two sets of microphones is a sound wave incident straight line; and the sound source distance difference refers to an absolute value of a difference of the distances between the sound source and two microphones in each set of microphones.

According to the method, the incident angle of at least one sound wave on any two planes that are not parallel, but coincident, relative to the fisheye lens is calculated through the incident straight line of the at least one sound wave; or the incident angles of at least two sound waves on two planes that are not parallel, but coincident, relative to the fisheye lens is calculated through the incident surfaces of the at least two sound waves, thereby displaying a position where the sound wave is located in a display device of the fisheye lens.

According to the method, at least four microphones are provided, thereby obtaining incident straight lines of at least two sound waves; an intersection of the incident straight lines of any two sound waves is the position where the sound source is located, so that the position where the sound source is located can be displayed in the display device of the fisheye lens.

According to the method, an incident angle of at least one sound wave on an any two planes relative to the incident angle of the fisheye lens is obtained through an incident straight line of the at least one sound wave, thereby obtaining a position of the sound source in the display device of the fisheye lens; and the distance between the sound source and the fisheye lens is calculated through the position, where the sound source is located, which is obtained through the incident straight lines of at least two sound waves, thereby displaying the position where the sound source is positioned in the display device of the fisheye lens by identifiers of different sizes according to the distance between the sound source and the fisheye lens.

According to the method, before the sound source distance difference is calculated, an original signal is subjected to FIR (Far infrared radiation) filtration first, and then is derived twice.

The present invention further provides a device for the method for positioning the sound source by adopting the fisheye lens, comprising a fisheye lens which is disposed fixedly and configured to acquire a display device, at least two microphone sets that are disposed fixedly and configured to acquire sound wave data, a processor configured to position a sound source, and a displaying device configured to display a sound source positioning structure.

The present invention further provides a device for the method for positioning the sound source by adopting the fisheye lens, comprising a fisheye lens which is disposed fixedly and configured to acquire a display device, at least three microphone sets that are disposed fixedly and configured to acquire sound wave data, a processor configured to position a sound source, and a displaying device configured to display a sound source positioning structure.

BENEFICIAL EFFECTS OF THE INVENTION

The method and device for positioning the sound source by using the fisheye lens as provided by the present invention have the following advantages, that include, but are not limited to the followings: the method and device for positioning the sound source by using the fisheye lens as provided by the present invention make use of the characteristics of the fisheye lens to realize angular positioning instead of positional positioning. In general case, it is not necessary to calculate specific coordinates of the sound source by means of formula calculation, such that the acoustic camera can position a sound source over a wide range and a large angle. In addition, by this algorithm, the number of microphones can be reduced, so that the acoustic camera can be miniaturized, and the cost can be greatly reduced, which greatly increases the popularity of the acoustic camera.

in which, the reference symbols present the following components: 1—fisheye lens; 2—microphone.

DETAILED DESCRIPTION

The present invention will now be further described in conjunction with the accompanying drawings, and the principles of such method and structure are apparent to those skilled in the art. It should be understood that the specific embodiments described herein are merely illustrative of the present invention and are not intended to limit the present invention.

A fisheye lens is a lens having a focal length of 16 mm or less and a viewing angle approaching or equal to 180 degrees. This is an extreme wide-angle lens, and commonly named the "fisheye lens". Since the angle range of the fisheye lens is a circle that approaches to 180 degrees on upper, lower, left and right sides, coordinate equations of the circle are listed by arcs formed by incident angles in the horizontal and vertical directions respectively, where an included angle between two sets of coordinate equations is an exact position of a target sound source in the imaging of the fisheye lens.

Figure 1:
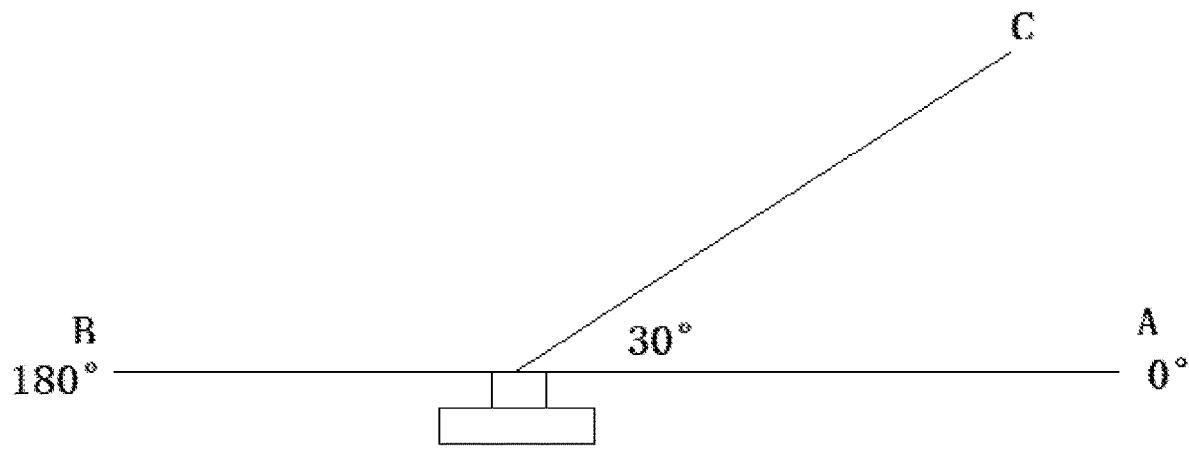
FIG. 1 is a schematic diagram showing the positions of points A, B, C and a fisheye camera in a horizontal direction.
Figure 2:
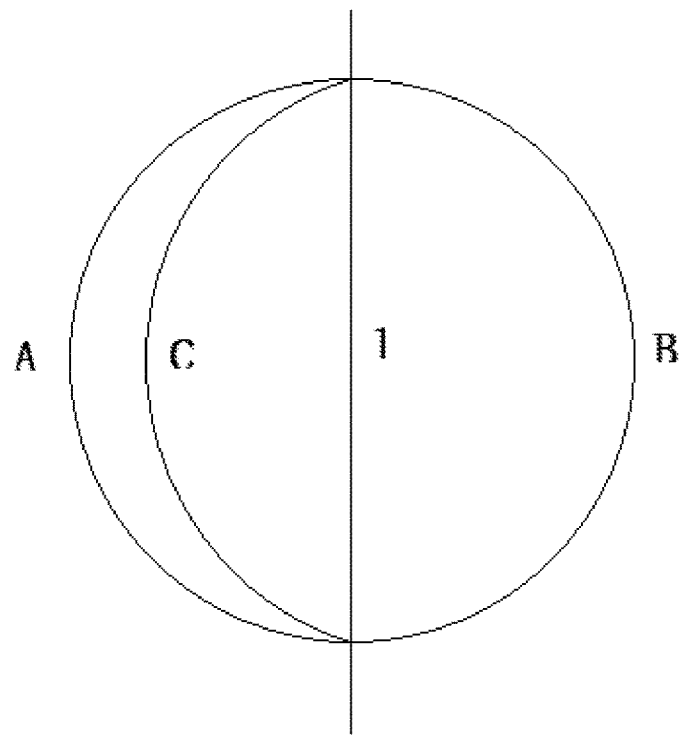
FIG. 2 is a schematic diagram showing a horizontal position imaged by the fisheye camera as shown in FIG. 1.

In the horizontal direction, when the sound source appears at the rightmost end of the fisheye lens, that is, at 0 degree, the sound source in this case is positioned at the rightmost end of a photo taken by the fisheye lens. When the sound source is positioned in a center line, the position where the sound source is positioned is a center line of the photo taken by the fisheye lens. As shown in FIGS. 1 and 2, the fisheye camera is positioned in the center. Three sound sources are positioned at A in a 0-degree position of the rightmost end, at B in a 180-degree position on the leftmost end, and at C having an included angle of 30 degree with a horizontal position on the right end. These three positions in the photo taken by the fisheye camera are at A on the leftmost end, as well as B and C on the rightmost end, respectively. A and B are differed by 180 degrees, a space between A and B is divided into 180 grids, and A and C are differed by 30 degrees. In the case that the center straight line of the photo is I, the horizontal positions that are spaced from A by 30 degrees are all located on an arc that passes through the point C and takes the center line I as a chord. Other angles may also be calibrated in the same way.

Figure 3:
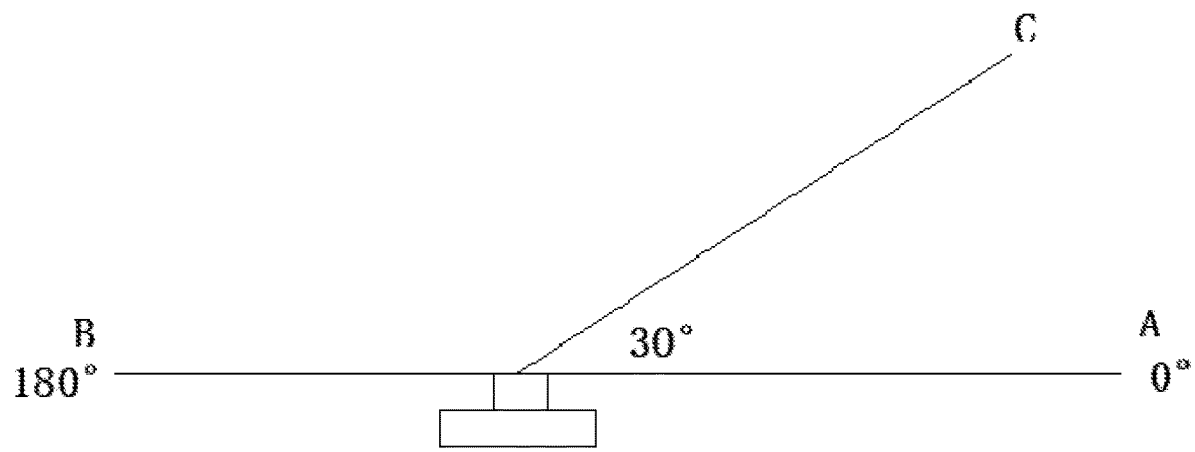
FIG. 3. is a schematic diagram showing the positions of points A, B, C and the fisheye camera in a vertical direction.
Figure 4:
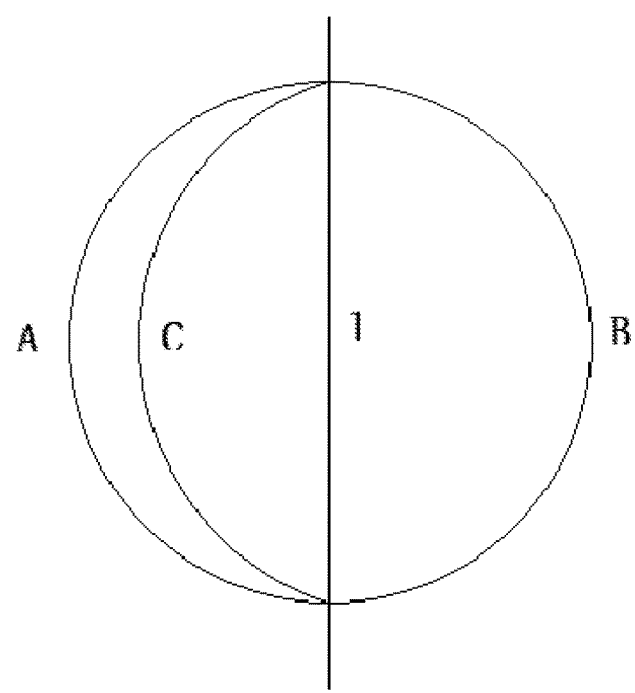
FIG. 4. is a schematic diagram of a vertical position imaged by the fisheye camera as shown in FIG. 1.

Similarly, in a vertical direction, as shown in FIGS. 3 and 4, the lowest point A in the side view is a 0-degree position, the uppermost point B is a 180-degree position, and a sound source C is located at a position having an angle of 30 degrees away from the lower end. A projection of point A in the photo is positioned on an arc with the center line I as a chord and an upper semicircle as an arc. The point B is positioned on an arc with the center line I as a chord and a lower semicircle as an arc. A and B are differed by 180 degrees. Therefore, a space between A and B is divided into 180 grids. The sound source C is located at a position having an angle of 30 degrees away from the point A. Therefore, on a section of arc with the center line 1 as a chord and being 30 grids away from the point A, the remaining positioning angles are positioned in the same way.

Figures 5, 6:
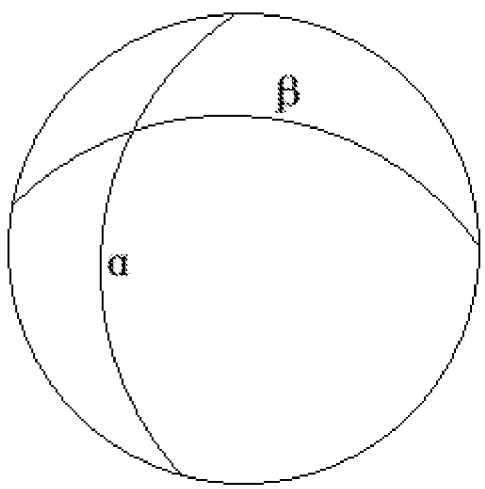
FIG. 5. is a schematic diagram showing an imaging position of the fisheye camera.
FIG. 6. is a flowchart of a method of the present invention.

As shown in FIG. 5, a point at which an arc where a horizontal incident angle of the sound source is $\alpha$ intersects with an arc where a vertical incident angle of the sound source is $\beta$ is a point at which the incident angle of the sound source is projected on the fisheye lens. A set of these points generates a cloud map through calculations with a computer, which can visually show the position of the sound source and the sound field. This embodiment is described with a horizontal surface and a vertical surface as examples. In fact, after the incident angles on any two non-coincident planes are combined, the incident angle position can be positioned on the photo of the fisheye lens.

Therefore, referring to FIG. 6, this embodiment provides a method for positioning a sound source by using a fisheye lens based on an imaging principle of the fisheye lens. In combination with the fisheye lens, the sound source is positioned according to the incident straight line or an incident angle of the sound wave. The method comprises mainly comprises the following steps:

a. calculating an incident angle or an incident straight line of the sound wave; and b. positioning the sound source according to the incident angle or the incident straight line of the sound wave in connection with the fisheye lens.

The incident angle and the incident straight line are substantially the same, this is because when the incident angle is determined, the incident straight line is also determined. When one determined incident straight line is obtained, the incident angle can naturally be obtained according to the incident straight line. The measurement of the incident angle of the sound source can be done by several or dozens of microphone pairs. By increasing the number of sampling points of the microphones, it is possible to make the time difference of the sound source reaching a pair of microphones, that is calculated by a cross-correlation function, more accurate. The technical solution is further described below through several specific embodiments.

Embodiment 1

In this embodiment, a database scanning method is provided first, which is suitable for arrays with a large number of microphones, including a spherical array. The main idea is to calculate a sound source distance difference of all relevant spatial positions reaching each pair of microphones in an array and to establish a database. If the database is scanned and a plurality of sound source distance differences are found to be consistent with values in the database, the current incident angle can be determined. In addition, in the method adopted in this embodiment, since the sound source is positioned by calculating an incident direction of the sound wave, a fisheye lens is used. The advantage of the fisheye lens is that the sound source can be positioned over 180 degrees from upper, lower, left and right sides. However, when it is determined that the sound source distance difference of the sound source reaching the two microphones is a specified value, all possible positions of the sound source are in a straight line that can orient the sound source.

Therefore, in this embodiment, the step a refers to calculating the incident straight lines or incident angles of the sound source at different positions as much as possible, and establishing a corresponding relationship of the incident angle of the sound wave, the distance between the sound source and the fisheye lens and the sound source distance difference. The step a may be implemented by the following steps: providing a fisheye lens and at least two microphones first, wherein every two microphones form a set of microphones, two microphones included in any two sets of microphones are not identical, and after the fisheye lens and all the microphones are set, their relative position coordinates are fixed without change; recording fixed coordinate values of the fisheye lens and all microphones, wherein data in the database is calibrated based on the coordinate values of the microphones and the fisheye lens, and the relative data position between the fisheye lens and the microphone when the database is used subsequently needs to be the same as the recorded fixed coordinate values; and then, calculating the sound source distance difference of each set of microphones corresponding to the incident angles of different sound waves and the distance between the sound source and the fisheye lens, wherein the sound source distance difference refers to an absolute value of a difference of the distances between the sound source and each microphone in each set of microphones.

Specifically, it is necessary to calculate the sound source distance difference of the relevant position of the currently defined microphone array first to establish a related database. The microphone array is composed of a plurality of microphones. The shape of the array is freely defined, and may be planar and stereoscopic. A planar array can be used when a range to be observed needs to be relatively narrow. A stereoscopic array (e.g., a spherical array) may be used when a range to be observed is relatively large. However, the coordinates of all the microphones in the space are fixed, and the position of the fisheye lens is also fixed in the spatial coordinates. Taking the horizontal plane as an example, the origin of the coordinates is the position of the fisheye lens, and the scanning positions of the incident angle of the sound wave from 0 to 180 degrees are calculated one by one. For example, the sound source distance differences of all the microphone sets are calculated first when the distance between the sound source and the fisheye lens is r in the case where the incident angle is 0 degree. Then, the sound source distance differences of all the microphone sets are calculated when the distance is 2r, 3r . . . until reaching the boundary point position. Next, the distance differences of all the microphone sets are calculated when the incident angle is 0+na (a is an angular increment, and n is a positive number), respectively, from r, 2r, 3r . . . and so on away from the fisheye lens, until reaching the boundary point, such that the entire half surface is scanned. Then, the same operation is performed in the vertical plane, so that the sound source distance difference of the corresponding microphone sets is obtained when the incident angles of different sound waves and the distance between the sound source and the fisheye lens are obtained, and a complete database is obtained, information on the sound source distance differences of the microphone sets at all points in the spatial range being stored in this database. With these detailed data, a comparison may be made during a test. For example, when the incident angle of the sound source is 56 degrees and the distance from the center is 3r, there is corresponding data in the database to match. If no relevant data is found, the sound source is not incident into the microphone from this direction, but most likely from the back of the fisheye lens.

Furthermore, when the distance difference between each microphone pair is calculated, an original signal may be subjected to FIR filtration and then derived twice. In this way, all the details of the two sets of signals will be compared by the same weight, which makes the correlation of the signals more stable and improves their robustness.

The step b refers to positioning the sound source by the corresponding relationship, and performing imaging display through the fisheye lens, and specifically includes: obtaining the incident angle of the sound wave and the distance between the sound source and the fisheye lens, that correspond to the measured sound source distance difference of the microphone sets, through the measured sound source distance difference of the microphone sets; and displaying a position where the sound source is positioned in a display device of the fisheye lens.

In this way, the incident angle of the corresponding sound wave and the distance between the sound source and the fisheye lens can be obtained through a database scanning method according to the sound source distance difference of the microphone sets. The sound source is positioned according to the fisheye lens through the incident angle of the sound wave and the distance between the sound source and the fisheye lens. The more the microphones are provided, the easier the data is processed by a mathematical statistic method, such as removing abnormal data and obtaining a more accurate result, so that the final positioning is more accurate.

Embodiment 2

This embodiment provides another implementation manner of this technical solution, which is a direct calculation method used for calibrating related data, without setting a database in advance, and is very economical to use on a small number of microphones. When only a few (at least 3) microphones is provided, a single sound source can be located by this method.

In this embodiment, the step a refers to obtaining an incident straight line or an incident angle of the sound wave. Specifically, at least three microphones are provided, wherein any two microphones form a set of microphones, and two microphones included in any two sets of microphones are not identical. The sound source distance difference of at least two sets of microphones is calculated. A sound wave incident surface of the sound wave relative to the microphone sets is calculated according to the sound source distance difference of any set of microphones. An intersection of the sound wave incident surfaces of any two sets of microphones is a sound wave incident line. Therefore, the incident straight line of at least one sound wave is obtained. The sound source distance difference refers to an absolute value of a difference of distances between the sound source and two microphones in each set of microphones.

For two microphones in the same plane, the incident straight line of the sound source in the plane can be calculated by the sound source distance difference between the two microphones. The sound source distance difference between the sound source and the plurality of microphones can be analyzed and obtained by calculation with a cross-correlation function for signals. Moreover, when the sound source distance difference between the two microphones is calculated, an original signal needs to be subjected to FIR filtration, and then is derived twice. In this way, all the details of the two sets of signals will be compared by the same weight, which makes the correlation of the signals more stable and improves their robustness.

In this case, the step b specifically includes: calculating the incident angle of the incident straight line of the sound wave on any two planes relative to the fisheye lens according to the incident straight line of the at least one sound wave. The fisheye lens imaging principle has been mentioned above. Therefore, when the incident angle of the sound wave on any two planes relative to the fisheye lens is calculated, the position where the sound source is positioned can be determined in the display device of the fisheye lens. Further, the position where the sound source is positioned is displayed in the display device. The incident angle of the incident straight line relative to the fisheye lens on any two planes that are not parallel, but coincident means that a projection of the incident straight line on any two planes that are not parallel, but coincident is obtained. Therefore, the incident straight line in the stereoscopic space is converted into an incident straight line in two planes, and the incident angles in the two planes are obtained. Preferably, the two planes may be selected as a vertical plane and a horizontal plane, or any other two mutually perpendicular planes.

Of course, the positioning of the display device of the fisheye lens only requires incident straight lines on at least two planes. Then, in the foregoing step a, in fact, only at least two sound wave incident surfaces that are not parallel, but coincident may be calculated. By means of the projection of the sound wave incident surface on a plane perpendicular to the sound wave incident surface, the incident straight lines and the incident angles on the two planes can be obtained, such that the sound source can be positioned in the display device of the fisheye lens.

For example, a description is made by taking two planes in the horizontal direction and the vertical direction as an example. It is assumed that a distance difference of the sound source reaching a microphone 2 and a microphone 2 is calculated as d by the measurement and the calculation of related signals, and the microphone 2 is closer to the sound source. It is assumed that the coordinates of the fisheye lens are (0,0), an angle in the horizontal direction is calculated (the same method is used for calculating an angle in the vertical direction). An arc is drawn by taking r1 as a radius and the microphone 2 as a circle center, another arc is then drawn by taking r2=r1+d as a radius and the microphone 2 as a circle center, and an intersection of the two arcs is the point A on the incident line of the sound source in the current plane. An arc is drawn by taking r11 (r11>r1) as a radius and the microphone 2 as a circle center, another arc is drawn by taking r22 (r22=r11+d) as a radius and the microphone 2 as a circle center, and an intersection B of the two arcs is a point B on the incident line of the sound source in the current plane. A straight line where a connection line of the two points of A and B is located is the incident line of the sound source in the current plane, and a plane perpendicular to the current plane and passing through the incident straight line is an incident surface of the sound source. The incident angle is naturally also obtained after the incident straight line is obtained. This method is faster and requires less microphones, so it is less demanding on a computer and greatly reduces the barrier to entry for acoustic cameras.

Embodiment 3

This embodiment is based on the improvement of Embodiment 2, so most of the content is the same as Embodiment 2, except that at least four microphones are provided in this embodiment. With at least four microphones, incident straight lines of at least two sound waves can be obtained. The closest position or intersection of the incident straight lines of any two sound waves is the position where the sound source is located. Therefore, the distance of the sound source away from the fisheye camera can be obtained. The position of the sound source in the display device of the fisheye camera, i.e., a point in the display device, can be obtained by the example of Embodiment 2. Since a point in the display device substantially represents a line in three-dimensional space, according to the method of this embodiment, at least four microphones are provided, such that the distance from the sound source away from the fisheye camera can also be obtained while the position of the sound source in the display device is obtained. Therefore, according to the distance of the sound source away from the fisheye camera, the position where the sound source is positioned is displayed in the display device of the fisheye lens by identifiers of different sizes, so that the sound source can be positioned more accurately.

Embodiment 4

A device for the method for positioning the sound source of the present invention mainly includes a microphone array, a fisheye lens, a processor and a display device, wherein the microphone array is configured to collect sound wave signals of a sound source and transmit relevant data to the processor; the processor is configured to perform positioning processing of the method of the present invention; the display device is configured to present a screen acquired by the fisheye lens and identify a sound source positioning structure in the displayed screen of the fisheye lens according to the processing result of the processor.

Figure 7:
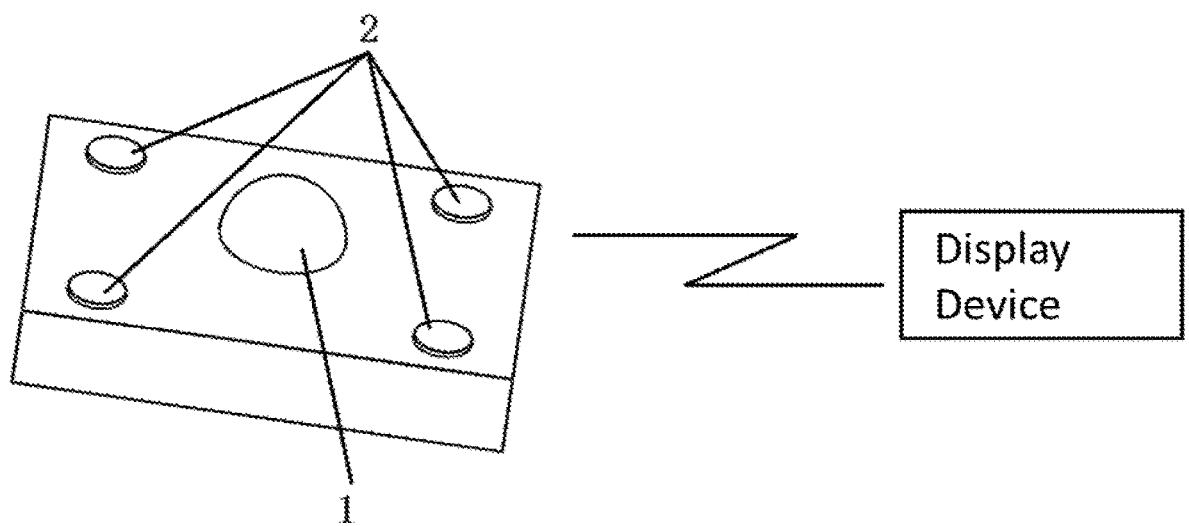
FIG. 7 is a schematic structural diagram of a device of the present invention in an embodiment.

The microphone array is composed of a plurality of microphones. The shape of the array is freely defined, and may be planar and stereoscopic. A planar array can be used when a range to be observed needs to be relatively narrow. A stereoscopic array (e.g., a spherical array) may be used when a range to be observed is relatively large. However, the coordinates of all the microphones in the space are fixed, and the position of the fisheye lens is also fixed in the spatial coordinates. The difference resides in that when the method of Embodiment 1 is used, at least two microphones need to be provided; when the method of Embodiment 2 is used, at least three microphones need to be provided; and when the method of Embodiment 3 is used, at least four microphones need to be provided. This embodiment provides a device including four microphones, referring to FIG. 7, which comprises a device body and a display device. The upper surface of the device body is provided with a fisheye lens fixed in the middle. Four microphones are fixedly provided at four corners of the device body. The fisheye lens and the four microphones are electrically connected to a processor and a power lamp unit, that are provided in the device body, through a circuit. The processor and the display device are in signal connection in a wired or wireless manner. The fisheye lens of the processor during the use process establishes a coordinate system for the origin, and the sound source is positioned by the various positioning methods provided by the embodiments and displayed by the display device.

What is claimed is:

1. A method for positioning a sound source by adopting a fisheye lens, the method comprising positioning a sound source by means of an incident straight line or an incidence angle of a sound wave in conjunction with a fisheye lens;
   wherein the method further comprising the following steps:
   a. establishing a corresponding relationship of an incidence angle of a sound wave, a distance between the sound source and the fisheye lens, and a measured sound source distance difference, to be specific: providing a fisheye lens and a plurality of microphones, any two microphones forming capably a set of microphones, and any two sets of microphones comprising three or four microphones; calculating a sound source distance difference of each set of microphones corresponding to the incident angles of different sound waves and the distance between the sound source and the fisheye lens, the measured sound source distance difference referring to an absolute value of a difference of the distances between the sound source and each microphone in each set of microphones; and
   b. positioning the sound source according to the corresponding relationship, and performing imaging display by using the fisheye lens, to be specific: obtaining the incident angle of the sound wave and the distance between the sound source and the fisheye lens, that correspond to the sound source distance difference of sets of microphones, through the measured sound source distance difference of the sets microphones, and displaying a position where the sound source is positioned in a display device connected to the fisheye lens.

2. The method for positioning the sound source by adopting the fisheye lens according to claim 1, wherein the method specifically comprises: providing at least three microphones, thereby obtaining an incident straight line of at least one sound wave or at least two sound wave incident surfaces which are not parallel, but coincident.

3. The method for positioning the sound source by using the fisheye lens according to claim 2, wherein any two microphones form capably a set of microphones, and any two sets of microphones comprising three or four microphones; the sound source distance difference of at least two sets of microphones is calculated; the sound wave incident surface of the sound wave relative to the set microphones is calculated according to the sound source distance difference of any set of microphones, and an intersection of the sound wave incident surfaces of any two sets of microphones is a sound wave incident straight line; and the sound source distance difference refers to an absolute value of a difference of the distances between the sound source and two microphones in each set of microphones.

4. The method for positioning the sound source by using the fisheye lens according to claim 3, wherein the incident angle of at least one sound wave on any two planes that are not parallel, but coincident, relative to the fisheye lens is calculated through the incident straight line of the at least one sound wave; or the incident angles of at least two sound waves on two planes that are not parallel, but coincident, relative to the fisheye lens is calculated through the incident surfaces of the at least two sound waves, thereby displaying a position where the sound wave is positioned in the display device connected to the fisheye lens.

5. The method for positioning the sound source by using the fisheye lens according to claim 2, wherein the incident angle of at least one sound wave on any two planes that are not parallel, but coincident, relative to the fisheye lens is calculated through the incident straight line of the at least one sound wave; or the incident angles of at least two sound waves on two planes that are not parallel, but coincident, relative to the fisheye lens is calculated through the incident surfaces of the at least two sound waves, thereby displaying a position where the sound wave is positioned in the display device connected to the fisheye lens.

6. The method for positioning the sound source by using the fisheye lens according to claim 3, wherein before the sound source distance difference is calculated, an original signal is subjected to FIR (Far infrared radiation) filtration first, and then is derived twice.

7. A device for the method for positioning the sound source by adopting the fisheye lens according to claim 2, comprising a fisheye lens which is disposed fixedly and configured to acquire an image, at least three microphone sets that are disposed fixedly and configured to acquire sound wave data, a processor configured to position a sound source, and a displaying device configured to display a sound source positioning structure.

8. The method for positioning the sound source by adopting the fisheye lens according to claim 1, wherein at least four microphones are provided, thereby obtaining incident straight lines of at least two sound waves; an intersection of the incident straight lines of any two sound waves is the position where the sound source is located, so that the position where the sound source is positioned can be displayed in the display device connected to the fisheye lens.

9. The method for positioning the sound source by adopting the fisheye lens according to claim 8, wherein an incident angle of at least one sound wave on an any two planes relative to the incident angle of the fisheye lens is obtained through an incident straight line of the at least one sound wave, thereby obtaining a position of the sound source in the display device connected to the fisheye lens; and
   the distance between the sound source and the fisheye lens is calculated through the position, where the sound source is located, which is obtained through the incident straight lines of at least two sound waves, thereby displaying the position where the sound source is positioned in the display device connected to the fisheye lens by identifiers of different sizes according to the distance between the sound source and the fisheye lens.

10. The method for positioning the sound source by using the fisheye lens according to claim 1, wherein before the sound source distance difference is calculated, an original signal is subjected to FIR (Far infrared radiation) filtration first, and then is derived twice.

11. A device for the method for positioning the sound source by adopting the fisheye lens according to claim 1, comprising a fisheye lens which is disposed fixedly and configured to acquire an image, at least two microphone sets that are disposed fixedly and configured to acquire sound wave data, a processor configured to position a sound source, and a displaying device configured to display a sound source positioning structure.

* * * * *